(12) United States Patent
Park et al.

(10) Patent No.: US 12,309,184 B2
(45) Date of Patent: *May 20, 2025

(54) SYSTEM AND METHOD FOR PROVIDING SECURITY TO IN-VEHICLE NETWORK

(71) Applicants: Hyundai Motor Company, Seoul (KR); Kia Corporation, Seoul (KR)

(72) Inventors: Seung Wook Park, Seoul (KR); Seil Kim, Seoul (KR); Aram Cho, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,375

(22) Filed: Nov. 6, 2023

(65) Prior Publication Data

US 2024/0073233 A1 Feb. 29, 2024

Related U.S. Application Data

(63) Continuation of application No. 16/771,904, filed as application No. PCT/KR2019/000832 on Jan. 21, 2019, now Pat. No. 11,848,947.

(60) Provisional application No. 62/620,754, filed on Jan. 23, 2018.

(51) Int. Cl.
*H04L 29/06* (2006.01)
*H04L 9/40* (2022.01)

(52) U.S. Cl.
CPC ........ *H04L 63/1425* (2013.01); *H04L 63/029* (2013.01); *H04L 63/1416* (2013.01); *H04L 63/20* (2013.01)

(58) Field of Classification Search
CPC .............. H04L 63/1425; H04L 63/029; H04L 63/1416; H04L 63/20; H04L 63/0263; H04L 2012/40273; H04L 2209/84; H04L 9/0894; H04L 12/40176; H04L 67/12;
(Continued)

(56) References Cited

U.S. PATENT DOCUMENTS

| 2003/0110397 A1* | 6/2003 | Supramaniam ..... G06F 21/6218 726/1 |
| 2003/0172166 A1* | 9/2003 | Judge .................... H04L 63/145 709/229 |
| 2011/0153149 A1 | 6/2011 | Jeon et al. |

(Continued)

FOREIGN PATENT DOCUMENTS

| CN | 104986347 A | 10/2015 |
| CN | 105050868 A | 11/2015 |

(Continued)

OTHER PUBLICATIONS

First Office Action from China National Intellectual Property Administration for Chinese Patent Application No. 2019800062174, dated Apr. 26, 2022, with English translation, 16 pages.

(Continued)

*Primary Examiner* — Ka Shan Choy
(74) *Attorney, Agent, or Firm* — Fox Rothschild LLP

(57) ABSTRACT

A system and a method of providing security to an in-vehicle network are provided. The method efficiently operates multiple detection techniques to maintain robustness against malicious message detection while increasing overall detection efficiency.

14 Claims, 3 Drawing Sheets

(58) Field of Classification Search
CPC .............. H04L 9/0891; H04L 63/1408; H04L 12/40104; H04L 2012/40215; H04W 4/48
See application file for complete search history.

(56) References Cited

U.S. PATENT DOCUMENTS

| | | |
|---|---|---|
| 2014/0247122 A1 | 9/2014 | Moeller et al. |
| 2015/0020152 A1* | 1/2015 | Litichever ............... H04L 63/08 726/1 |
| 2015/0067862 A1* | 3/2015 | Yu ........................... G06F 21/56 726/24 |
| 2015/0271201 A1 | 9/2015 | Ruvio et al. |
| 2016/0205117 A1 | 7/2016 | Laifenfeld et al. |
| 2017/0013005 A1 | 1/2017 | Galula et al. |
| 2017/0026386 A1* | 1/2017 | Unagami .......... H04L 12/40032 |
| 2017/0147812 A1* | 5/2017 | Ujiie .................... B60R 16/0231 |
| 2017/0286675 A1 | 10/2017 | Shin et al. |
| 2018/0076970 A1* | 3/2018 | Han ........................ H04L 12/46 |
| 2020/0092129 A1* | 3/2020 | Lin ..................... H04L 12/4625 |

FOREIGN PATENT DOCUMENTS

| | | | |
|---|---|---|---|
| CN | 105825679 | A | 8/2016 |
| JP | 2016502697 | A | 1/2016 |
| KR | 10-2015-0073176 | A | 6/2015 |
| WO | 2014061021 | A1 | 4/2014 |

OTHER PUBLICATIONS

Office Action for Korean Patent Application No. 10-2020-7015154, dated May 27, 2020, 17 pages, with English translation.

* cited by examiner

SYSTEM AND METHOD FOR PROVIDING SECURITY TO IN-VEHICLE NETWORK

CROSS-REFERENCE TO RELATED APPLICATION

This Application is a Continuation of U.S. application Ser. No. 6/771,904 filed on Jun. 11, 2020, which is incorporated herein by reference in its entirety. U.S. application Ser. No. 16/771,904 is a National Phase application filed under 35 USC 371 of PCT International Application No. PCT/KR2019/000832, with an International Filing Date of Jan. 21, 2019, which claims the benefit of U.S. Provisional Application No. 62/620,754 filed on Jan. 23, 2018, which are incorporated herein by reference in their entirety.

TECHNICAL FIELD

The present disclosure, in some embodiments, relates to providing security to an in-vehicle network.

BACKGROUND

The statements in this section merely provide background information related to the present disclosure and do not necessarily constitute prior art. Intrusion Detection System (IDS) and Intrusion Protection System (IPS) have been widely used in network security. The IDS monitors network activity and detects suspicious behavior. The IPS refers to a system that has the function or capability to respond to a detected intrusion by, for example, blocking a signal that may affect the system. The IDS and IPS are generally used together into such a system referred to as an Intrusion Detection and Prevention System (IDPS).

An ever-increasing number of electronic control units (ECUs) are mounted within a vehicle which in turn connects via wired and wireless networks to an external network, and in concert therewith, the IDS or IDPS is provided to detect and respond to the security threat to the internal network of the vehicle.

SUMMARY

The present disclosure seeks to provide an architecture of an Intrusion Detection System (IDS) for mounting on a vehicle and efficient methods of operating a plurality of detection schemes to reduce required system resources while maintaining robustness against malicious message detection.

At least one aspect of the present disclosure provides an intrusion detection system that provides security to an in-vehicle network and may include a message queue module, storage, and a rule engine. The message queue module is configured to store network messages collected from the in-vehicle network in a message queue. The storage is configured to securely store a rule set used in a plurality of detection techniques. The rule engine is configured to update the rule set stored in the storage with a new rule set downloaded from a backend server on an external network, and to sequentially apply the plurality of detection techniques to a collected network message to determine whether the collected network message is a security threat message. The plurality of detection techniques may include a static detection technique, a misuse detection technique, and an anomaly detection technique.

Embodiments of the intrusion detection system may further include features as follows. In some embodiments, the rule engine is configured to be responsive to any one of the plurality of detection techniques that determine the collected network message as a security threat message for bypassing a subsequent application of the remaining detection techniques to the collected network message. In some embodiments, the rule engine is configured to apply to the collected network message a static detection technique, a misuse detection technique, and an anomaly detection technique in the order as recited.

In some embodiments, the intrusion detection system is embedded in any one of ①a central gateway configured to connect an external network with the in-vehicle network, ② a sub-gateway configured to connect each of functional domains of the in-vehicle network with the central gateway, and ③ an electronic control unit (ECU) belonging to each of the functional domains. In some embodiments, the rule engine is configured to be responsive to all of the plurality of detection techniques determining that the collected network message is not a security threat message for allowing the collected network message to be transferred to the central gateway, the sub-gateway, or a software application of the electronic control unit.

In some embodiments, the intrusion detection system is a separate computing device connected as a node to the in-vehicle network. In some embodiments, the intrusion detection system further includes a crypto module configured to perform encryption and decryption of the rule set and to manage an associated key. In some embodiments, the intrusion detection system further includes an interface manager configured to manage a communication linkage with the backend server to allow a new rule set to be downloaded from the backend server or a detection log to be transmitted to the backend server. In some embodiments, the in-vehicle network is a controller area network (CAN).

Another aspect of the present disclosure provides a method performed by an intrusion detection system that provides security to an in-vehicle network and may include downloading a rule set used in a plurality of detection techniques from a backend server on an external network and thereby updating a pre-stored rule set, and storing network messages collected from the in-vehicle network in a message queue, and sequentially applying the plurality of detection techniques to a collected network message to determine whether the collected network message is a security threat message. In some embodiments, the sequentially applying of the plurality of detection techniques includes, in response to any one of the plurality of detection techniques determining the collected network message as a security threat message, bypassing a subsequent application of the remaining detection techniques to the collected network message.

The methods described above may be performed by at least one electronic apparatus that includes at least one processor and a memory in which instructions are recorded. For example, the instructions, when executed by the at least one processor, cause the electronic apparatus to perform the methods described above.

Yet another aspect of the present disclosure provides a system for providing security to an in-vehicle network, which may include a first electronic apparatus configured to operate as a first node on the in-vehicle network and a second electronic apparatus configured to operate as a second node. Each of the first electronic apparatus and the second electronic apparatus may be incorporated or embedded with the aforementioned intrusion detection system. The first electronic apparatus may be a central gateway configured to connect the external network with the in-vehicle network or a sub-gateway configured to connect each of the functional domains of the in-vehicle network with the central gateway. The second electronic apparatus may be an electronic control unit (ECU) belonging to each of the functional domains. The first electronic apparatus may use a static detection technique, a misuse detection technique, and an anomaly detection technique. The second electronic apparatus may use only some of the static detection technique, the misuse detection technique, and the anomaly detection technique.

As described above, with the provided methods and electronic apparatuses, robustness can be maintained against malicious message detection while rapidly detecting an attack message, thereby increasing overall detection efficiency.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
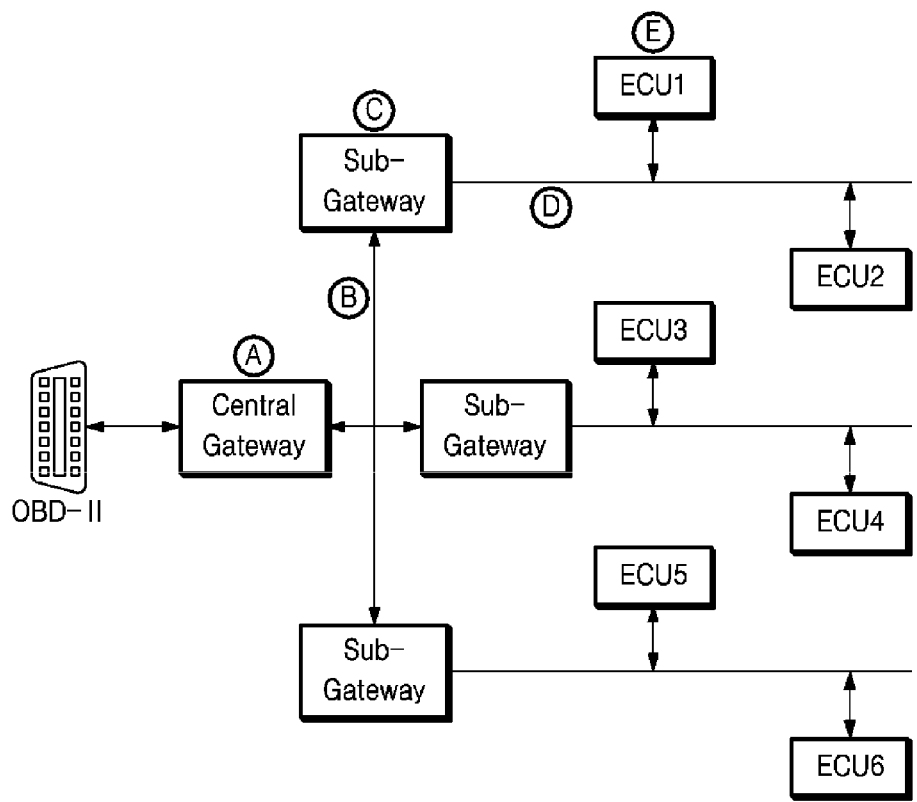
FIG. 1 illustrates locations where an IDS may be deployed on a controller area network (CAN).

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely for the purpose of differentiating one component from the other, not to imply or suggest the substances, the order or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

FIG. 1 illustrates locations such as Ⓐ, Ⓑ, Ⓒ, Ⓓ, and Ⓔ at which an IDS (Intrusion Detection System) may be deployed on a controller area network (CAN). A central gateway (CGW) shown is a central communication node that serves as a router for transferring data between various domains within a vehicle and serves as a gate for communications between an external network and an in-vehicle network. The central gateway (CGW) may be viewed as a gate for all data coming into the vehicle. Sub-gateways are local communication nodes that are each responsible for a particular functional domain, such as a power train, chassis, body, infotainment, etc. FIG. 1 presupposes that electronic control units (ECUs) are connected to a CAN bus in the respective functional domains, although the ECUs may be connected to a bus using other communication protocols (e.g., LIN, FlexRay, Ethernet, etc.) in some functional domains.

The merits and issues of the respective locations are as follows.

Ⓐ At central gateway: Where all CAN domains connect to the outside, an IDS may be installed to detect all attacks coming into the network CAN via an OBD port. This allows for identification of a message having an intention of attack in advance before affecting the CAN. However, with excessive messages to process data being collected in comparison with other locations, the IDS location is difficult to effectively cope with an attack due to the difficulty of distinguishing an intrusive attack to an internal network from a nonintrusive message.

Ⓑ After central gateway: An IDS may check the message after filtering by the central gateway. This allows for detection of attackers that are fewer, but more determined than before passing through location Ⓐ. In addition, this allows for detection of hacking by an external hacker directly accessing the backbone network CAN and injecting a malicious message.

Ⓒ At sub-gateway: Where management is performed on CAN messages that are transmitted and received to and from a specific CAN domain, an IDS may be installed to more easily detect a discrepancy between a CAN message at Ⓑ and a CAN message flowing in the specific CAN domain. At this location for detecting an attack directed to another domain from inside the CAN domain, the IDS may detect an attacker inside the CAN domain with a high level of success.

Ⓓ After sub-gateway: Where hacking of the system is more difficult through double gateways with a specific malicious message. However, when an internal ECU (electronic control unit) has been damaged by an attacker, or when a malicious ECU has been introduced and spoofed as a replacement, and when an external entity directly connects to the CAN bus in a domain, a malicious message is still capable of being transmitted to the CAN bus in that domain. Therefore, this installation location may be considered when the internal ECU is not reliable and monitoring is needed against a network hacking of a specific CAN domain to which the ECU belongs.

Ⓔ Mounting on ECU: The ECU receives all messages present on the network and selectively processes the required messages by checking the IDs of the necessary CAN messages. The control unit analyzes the contexts of the CAN status message and a command message received from the outside of the control unit and implements the messages. Therefore, the ECU requires a high level of security due to requiring protection from both the outside and the inside thereof. Mounting the IDS on the ECU prevents loss of critical data possessed by the ECU or a malfunction against a highly sophisticated internal/external attacker capable of falsifying the ECU.

A plurality of IDS systems may be equipped (or embedded) in at least one of such locations Ⓐ, Ⓑ, Ⓒ, Ⓓ, and Ⓔ at which the IDS systems may be placed as illustrated in FIG. 1. For example, the IDS systems may be equipped on the central gateway and the plurality of sub-gateways, respectively, and the IDS systems may be equipped on the central gateway and the main ECU, respectively. In addition, each domain may be equipped with dedicated electronic control units that perform monitoring. These IDS systems may complementarily monitor the network and detect an attempted attack, thereby enhancing the security of the vehicle network.

Figure 2:
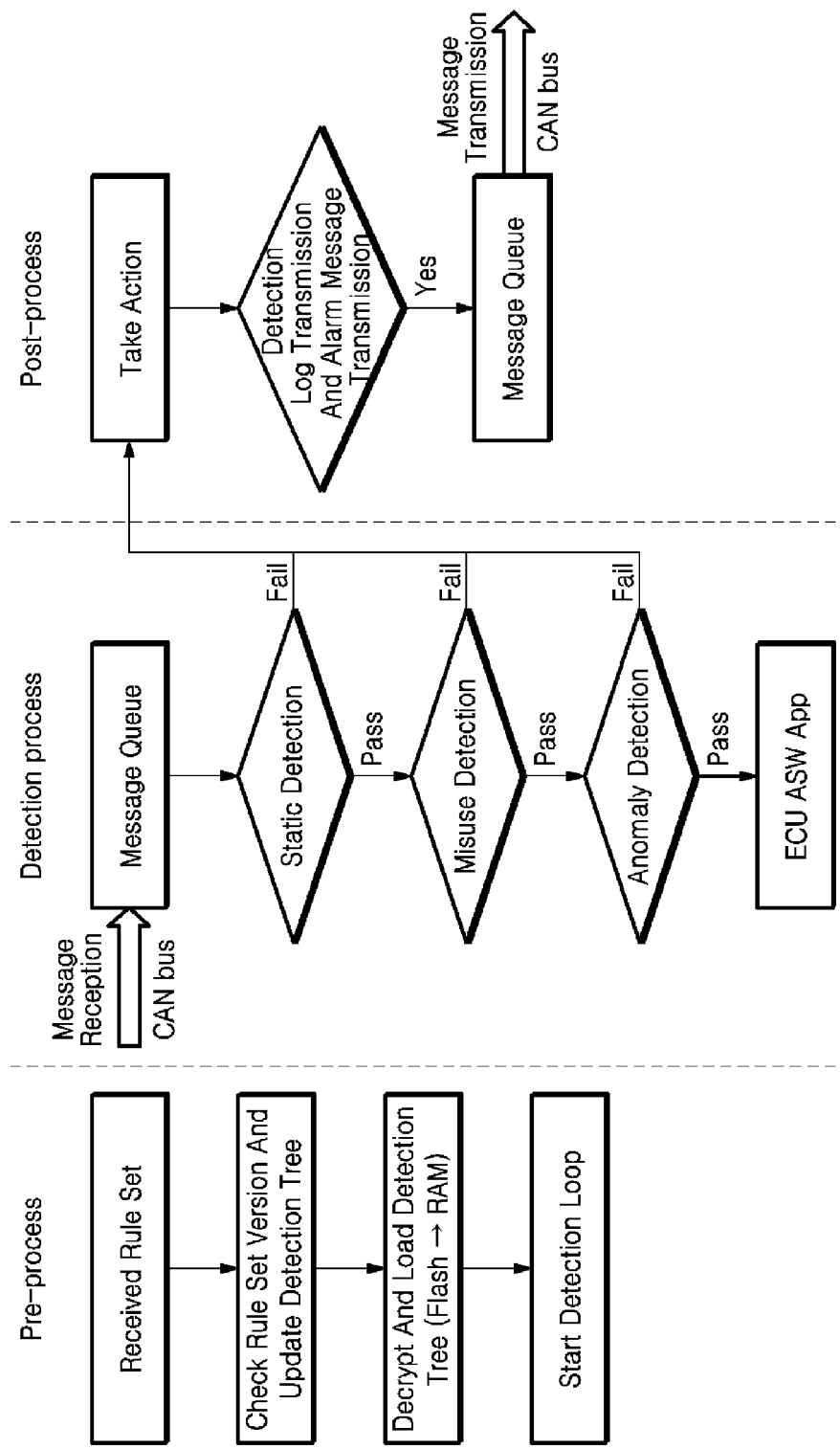
FIG. 2 is a functional block diagram of an IDS or IDPS according to at least one embodiment of the present disclosure.

FIG. 2 is a functional block diagram of an intrusion detection system (IDS) according to at least one embodiment of the present disclosure. As illustrated in FIG. 2, an IDS for an in-vehicle network may include a message queue module 20, a rule engine 30, a crypto module 40, an interface manager 50, and a storage 60. The IDS illustrated in FIG. 2 may be implemented as a dedicated electronic control unit(s) which is embedded in the gateway(s) or ECU(s) illustrated in FIG. 1 or linked to the in-vehicle network.

The message queue module 20 stores, in a message queue, all the CAN traffic data collected by the CAN bus. The request of other modules of the IDS for the collected traffic data is processed by the message queue module 20. The rule engine (or called 'detection engine') 30 is a module that operates as a detector and responder that is an essential function of the IDS. The function of the rule engine 30 may be broadly divided into a pre-process 31, a detection process 32, and a post-process 33. The pre-process 31 updates the rule set stored in the storage 60 with a rule set 10 obtained via various devices (e.g., a back-end server, a USB memory stick, an SD card, etc.) or resets the IDS. The detection process 32 detects a malicious message during operation of the vehicle. The post-process 33 determines how to process the detected malicious message. For example, the post-process 33 may drop or log a detected malicious message or generate an alarm.

The crypto module 40 encrypts or decrypts the rule set and the detection log and manages the associated keys. The interface manager 50 manages the communication link with the backend server to thus download the new rule set 10 from the backend server or transmit the detection log to the backend server. The rule set and the detection log are encrypted by an encryption engine and stored securely in the storage 60 (e.g., flash memory). The storage 60 may be provided by other nodes on the network. In particular, the interface manager 50 may manage a communication link with the storage 60 located at another node, too.

Figure 3:
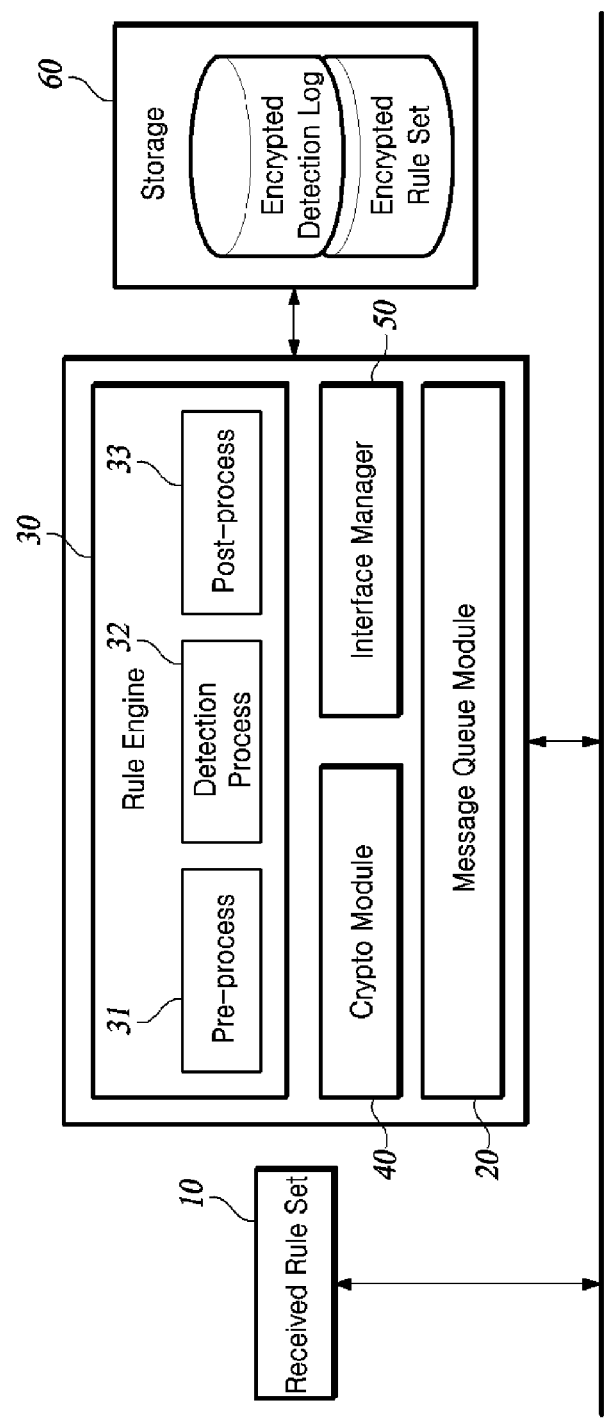
FIG. 3 is a flowchart of an illustrative method of operating an IDS according to at least one embodiment of the present disclosure.

FIG. 3 is a flowchart of an illustrative method of operating an IDS according to at least one embodiment of the present disclosure. The IDS may be configured to perform a pre-process when the vehicle is turned on, and then repeatedly perform a detection process and a post-process until the vehicle is powered off.

In the pre-process, when restarted, the IPS checks the version of the rule set and, when the rule set currently stored in the storage is not the latest version, updates the rule set with, for example, the latest version of the rule set downloaded via the OTA or OBD port. Thereafter, the IDS decrypts and loads the encrypted rule set stored in the storage into an internal memory (RAM). When the pre-process is terminated, a detection process begins, which is a substantial detection operation of the IDS.

The rule set is a set of predefined rules used by a plurality of detection techniques performed in the detection process for detecting a network message associated with a security threat. The rule set includes a CAN database (DB) used in the static detection, a blacklist used in the misuse detection, and a profile used in the anomaly detection, which are described below. In a detection process, the IDS may be responsive to a new CAN message arriving at a message queue for sequentially performing the static detection, misuse detection, and anomaly detection techniques to determine whether the new CAN message is a network message associated with a security threat, which will be referred to as a 'security threat message', an 'abnormal message', a 'malicious message', an 'attack message', or a message that failed a check or 'failed message'.

In the post-process, actions are executed such as passing, blocking, logging, or warning based on the results of checking the CAN messages. For example, the IDS may pass a CAN message containing a detection log via the CAN network to a gateway or telematics device that may be communicatively linked to a remote network, to transmit the detection log to the back-end server on the remote network.

The characteristics, merits, and issues of the intrusion detection techniques described above are as follows.

The static detection is a technique for monitoring the message ID, message length, message transmission period, etc. and performing a validity check by comparing the monitored data to predetermined rules. Specifically, in static detection, the collected messages are checked against a 'valid message format' previously established by the manufacturer. The static detection consumes fewer system resources compared to the misuse detection and the anomaly detection. However, the validity check alone is impossible to detect malicious data and others in the message.

The misuse detection is a technique for detecting a predefined attack pattern through a vulnerability analysis of a vehicle system. This pattern of attack is also referred to as a signature, so the misuse detection is also named signature-based detection. The misuse detection determines whether the collected message is a malicious message by checking a blacklist in which the signatures of the malicious message are recorded without considering the state of the vehicle. The misuse detection is advantageous in that it consumes fewer resources of the system and has a high probability of detection, but requires defining a new signature for every new attack, thus requiring a substantial amount of time and a substantial amount of security human resources to cope with the newly emerging attack. This technique may cause the false negative (type 2 error) problem of occasionally missing an actual attack.

The anomaly detection is a technique for checking whether a message of interest is within a normal message category based on the state of the vehicle, and it is performed following detection rules based on the status of the vehicle and the command message. The anomaly detection is a technique for collecting and analyzing ordinary behavior on a network to define a normal pattern (which may also be referred to as a 'profile') and then detecting anomaly behavior beyond a certain threshold off the normal pattern. The anomaly detection is also referred to as a profile-based detection. With the anomaly detection, even when a new attack occurs, one may detect when such an attack deviates from the normal pattern, and requires less security human resources compared to the misuse detection method. However, the anomaly detection requires substantial system resources, and it may cause the false positive (type 1 error) problem of mistaking normal activity within a predetermined threshold value for an intrusion.

According to the illustrated operation of FIG. 3, each message stacked in a message queue is determined by the detection process including three detection techniques (i.e., detection of static detection→misuse detection→anomaly detection) while blocking or passing the message. In addition, the normal CAN swap message is also transmitted to the gateway or the ECU's software application on which it is equipped after the detection process consisting of three techniques. However, the detection process is configured to be responsive to the first one of the detection techniques, which has been applied determining the CAN network message as a security threat message for bypassing a subsequent application of the remaining detection techniques to that message. Particularly, it is worth noting the order of application of the three detection techniques. The earlier the application of select detection techniques with higher detection efficiency, requiring lower computing power, and taking less time the more the efficiency of the overall detection process. This is achieved by the present disclosure with the detection process configured to first apply such techniques as predicted to require less computing power and a reduced process time. The configuration of such detection process may increase the overall detection efficiency while maintaining robustness against malicious message detection.

In the operation of the illustrated IDS of FIG. 3, three detection techniques of the static detection, misuse detection, and anomaly detection are all used in the detection process. However, depending on the location where IDS is installed or embedded, some of the three detection techniques may be omitted. For example, considering that the anomaly detection requires substantial computing power and time, the detection process of the IDS equipped on the ECU may be arranged to use the static detection alone, or to use just the static detection and misuse detection. On the other hand, all three detection techniques may be used by the detection process of the IDS equipped on a (central/sub-) gateway having a relatively high computing power. As another example, the central gateway uses all three detection techniques, the sub-gateway uses just the static detection and misuse detection, and the ECU employs the static detection alone.

It is to be understood that the illustrative embodiments described above may be implemented in many different ways. In some examples, the various methods, apparatuses, systems described in this disclosure may be implemented by or included in an electronic controller, a gateway, or the like having a processor, memory, communication interface, and the like. For example, the electronic controller may operate as an apparatus that executes the methods described above by loading software instructions into the processor and then executing the instructions to perform the functions described in this disclosure.

The various methods described in this disclosure, on the other hand, may be implemented with instructions stored in a non-transitory recording medium that may be read and executed by one or more processors. The non-transitory recording medium includes, for example, all types of recording devices in which data is stored in a form readable by a computer system. By way of example, and not limitation, the non-transitory recording medium includes storage media such as erasable programmable read-only memory (EPROM), electrically erasable programmable read-only memory (EEPROM), flash memory, optical drive, magnetic hard drive, solid-state drive (SSD).

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An electronic device connected to an in-vehicle network, for providing security to the in-vehicle network, the electronic device comprising:
   at least one processor; and
   a memory in which instructions are recorded, wherein the instructions, when executed by the at least one processor, cause the at least one processor to implement:
      a message queue module configured to store network messages collected from the in-vehicle network in a message queue;
   a storage configured to store a rule set used in a plurality of detection techniques; and
   a rule engine configured to update the rule set stored in the storage with a new rule set downloaded from a backend server on an external network, and sequentially apply the plurality of detection techniques to a collected network message so as to determine whether the collected network message is a security threat message, the plurality of detection techniques including a static detection technique, a misuse detection technique, and an anomaly detection technique, and
   wherein the rule engine is further configured to:
      apply to the collected network message the static detection technique, the misuse detection technique, and the anomaly detection technique in an order as recited; and
      bypass a subsequent application of remaining detection techniques to the collected network message in response to any one of the plurality of detection techniques determining the collected network message as a security threat message, thereby minimize the execution of the anomaly detection technique that is relatively time-consuming, requires relatively high computational power and causes false positive problems relatively frequently compared to the static detection technique and the misuse detection technique.

2. The electronic device of claim 1, which is any one of:
   a central gateway configured to connect an external network with the in-vehicle network;
   a sub-gateway configured to connect each of functional domains of the in-vehicle network with the central gateway; and
   an electronic control unit (ECU) belonging to each of the functional domains.

3. The electronic device of claim 2, wherein the rule engine is configured to allow the collected network message to be transferred to a software application of the central gateway, the sub-gateway or the electronic control unit in response to all of the plurality of detection techniques determining that the collected network message is not a security threat message.

4. The electronic device of claim 1, which is a computing device dedicated for intrusion detection.

5. The electronic device of claim 1, further comprising:
   a crypto module configured to perform an encryption and a decryption of the rule set and to manage an associated key.

6. The electronic device of claim 1, further comprising:
   an interface manager configured to manage a communication linkage with the backend server to download a new rule set from the backend server or to transmit a detection log to the backend server.

7. The electronic device of claim 1, wherein the in-vehicle network includes:
a controller area network (CAN).

8. A method performed by an electronic device connected to an in-vehicle network for providing security to the in-vehicle network, the method comprising:
downloading a rule set used in a plurality of detection techniques from a backend server on an external network and thereby updating a pre-stored rule set;
storing network messages collected from the in-vehicle network in a message queue; and
sequentially applying the plurality of detection techniques to a collected network message so as to determine whether the collected network message is a security threat message, the plurality of detection techniques including a static detection technique, a misuse detection technique, and an anomaly detection technique, and
wherein the sequentially applying the plurality of detection techniques including:
applying to the collected network message the static detection technique, the misuse detection technique, and the anomaly detection technique in an order as recited; and
bypassing a subsequent application of remaining detection techniques to the collected network message in response to any one of the plurality of detection techniques determining the collected network message as a security threat message, thereby minimizing the execution of the anomaly detection technique that is relatively time-consuming, requires relatively high computational power and causes false positive problems relatively frequently compared to the static detection technique and the misuse detection technique.

9. The method of claim 8, wherein the electronic device is any one of:
a central gateway configured to connect an external network with the in-vehicle network;
a sub-gateway configured to connect each of functional domains of the in-vehicle network with the central gateway; and
an electronic control unit (ECU) belonging to each of the functional domains.

10. The method of claim 9, further comprising
allowing the collected network message to be transferred to a software application of the central gateway, the sub-gateway or the electronic control unit in response to all of the plurality of detection techniques determining that the collected network message is not a security threat message.

11. The method of claim 8, wherein the electronic device is a computing device dedicated for intrusion detection.

12. The method of claim 8, further comprising:
a crypto module configured to perform an encryption and a decryption of the rule set and to manage an associated key.

13. The method of claim 8, further comprising:
transmitting a detection log to the backend server.

14. The method of claim 1, wherein the in-vehicle network includes:
a controller area network (CAN).

* * * * *